(12) United States Patent
Okabe

(10) Patent No.: US 8,495,364 B2
(45) Date of Patent: Jul. 23, 2013

(54) IMAGE PROCESSING APPARATUS AND METHOD USING ELECTRONIC SIGNATURE INFORMATION

(75) Inventor: Kiwamu Okabe, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 914 days.

(21) Appl. No.: 12/207,758

(22) Filed: Sep. 10, 2008

(65) Prior Publication Data

US 2009/0073492 A1    Mar. 19, 2009

(30) Foreign Application Priority Data

Sep. 14, 2007   (JP) ................................. 2007-239567

(51) Int. Cl.
 *G06F 21/00* (2006.01)
(52) U.S. Cl.
 USPC ......................................................... 713/164
(58) Field of Classification Search
 USPC ........................ 713/164; 358/1.13, 1.15, 1.16
 See application file for complete search history.

(56) References Cited

U.S. PATENT DOCUMENTS

| 7,318,151 | B1 * | 1/2008 | Harris ................................. 713/2 |
| 2003/0217358 | A1 * | 11/2003 | Thurston et al. ............... 717/174 |
| 2004/0239975 | A1 * | 12/2004 | Kawaura et al. .............. 358/1.14 |
| 2005/0005204 | A1 * | 1/2005 | Kobayashi ........................ 714/48 |
| 2006/0140658 | A1 * | 6/2006 | Shimizu ............................ 399/77 |
| 2006/0244987 | A1 * | 11/2006 | Okabe ............................ 358/1.13 |
| 2007/0159650 | A1 * | 7/2007 | Takamatsu et al. ........... 358/1.15 |

FOREIGN PATENT DOCUMENTS

| JP | 2004-46802 | 2/2004 |
| JP | 2004-287840 | 10/2004 |
| JP | 2005-27162 | 1/2005 |
| JP | 2005-148934 | 6/2005 |
| JP | 2005-174199 | 6/2005 |
| JP | 2005-174200 | 6/2005 |
| JP | 2005-202935 | 7/2005 |
| JP | 2007-156855 | 6/2007 |
| JP | 2007-213246 | 8/2007 |

OTHER PUBLICATIONS

Japanese Office Action issued in Application No. JP2007-239567, mailed on Jun. 12, 2012.

* cited by examiner

*Primary Examiner* — Chau Le
(74) *Attorney, Agent, or Firm* — Oblon, Spivak, McClelland, Maier & Neustadt, L.L.P.

(57) ABSTRACT

A storage medium is inserted in a storage-medium drive unit in a removable manner, storing information including setting information on a target program, identification information for identifying the storage medium, and electronic signature information generated from the setting information and the identification information. A launching unit performs an authentication of the setting information using the identification information and the electronic signature information read by a reading unit, and when the authentication is successful, reads the target program from a storage unit and launches the target program according to the setting information.

8 Claims, 10 Drawing Sheets

FIG. 5

```
mount msdosfs /dev/sd0 /mnt/sd0
mount msdosfs /dev/sd1 /mnt/sd1
mount msdosfs /dev/sd2 /mnt/sd2
mount msdosfs /dev/sd3 /mnt/sd3
mount gzromfs 0xXXXXXXXX /arch/basesrv
mount gzromfs 0xXXXXXXXX /arch/copy
mount md /md. img /mnt/md
```

FIG. 6

```
+init. d/+printer. cnf
       +scanner. cnf
```

FIG. 7

```
mount msdosfs /mnt/romopt/font.mod /arch/font
mount msdosfs /mnt/romopt/printer.mod /arch/printer
```

FIG. 8

```
mount msdosfs /mnt/romopt/scanner.mod /arch/scanner
```

```
mount gzromfs /mnt/romopt/printer.mod /arch/printer
exec /arch/printer/printer
```

IMAGE PROCESSING APPARATUS AND METHOD USING ELECTRONIC SIGNATURE INFORMATION

CROSS-REFERENCE TO RELATED APPLICATIONS

The present application claims priority to and incorporates by reference the entire contents of Japanese priority document 2007-239567 filed in Japan on Sep. 14, 2007.

BACKGROUND OF THE INVENTION

1. Field of the Invention

The present invention relates to an image processing apparatus and image processing method.

2. Description of the Related Art

In recent years, with an increased number of pixels of digital cameras and downsizing of portable digital music players, demands for storage media using large-capacity, high-speed NAND flash memory have been increasing. Also, multifunctional products (MFPs) in recent years have come to have higher performance, and the size of firmware for controlling devices has been steadily increasing. Thus, today, as a storage medium incorporated in an MFP, a large-capacity inexpensive NAND flash memory is being used in place of a small-capacity expensive NOR flash memory. Conventionally, in some cases, software, such as firmware, cannot fully fit in an NOR flash memory, and therefore technologies have been proposed such that optional software for use in an MFP is stored in a portable storage medium, such as a Secure Digital (SD) card, and is read from the storage medium for execution (for example, see Japanese Patent Application Laid-Open No. 2005-202935, Japanese Patent Application Laid-Open No. 2005-174200, Japanese Patent Application Laid-Open No. 2005-174199, Japanese Patent Application Laid-Open No. 2005-148934, and Japanese Patent Application Laid-Open No. 2004-287840).

Even in such an MFP, by storing the optional software in a NAND flash memory, a reduction in cost associated with production of the portable storage medium that stores the optional software and an increase in data transfer rate are expected. On the other hand, because the optional software may be illegally copied into a NAND flash memory, a mechanism that prevents unauthorized use of the optional software is required.

Furthermore, in general, manufacturers provide a lineup of products for one series of MFP, thereby offering devices suitable for functions and prices desired by users. In some cases, a product in the lineup is produced by adding hardware as a physical option, such as a hard disk device (HDD) or a network card, to a conventional MFP. For such a product, component management for production is relatively easy. However, when different products with different types of firmware are produced, different controller boards in each of which a relevant firmware is installed have to be fabricated for the respective products. Therefore, when the number of products is increased due to different types of firmware installed, the number of seemingly identical components is increased at the time of production, thereby possibly causing erroneous mounting of a controller board.

SUMMARY OF THE INVENTION

It is an object of the present invention to at least partially solve the problems in the conventional technology.

According to one aspect of the present invention, there is provided an image processing apparatus including an image processing unit that processes an image; a storage unit that stores therein a program for the image processing unit to process the image; a storage-medium drive unit in which a storage medium is inserted in a removable manner, where the storage medium stores therein setting information on a target program to be launched, storage-medium identification information for uniquely identifying the storage medium, and electronic signature information generated from the setting information and the storage-medium identification information; a reading unit that reads the setting information, the storage-medium identification information, and the electronic signature information from the storage medium; and a launching unit, that performs an authentication of the setting information using the storage-medium identification information and the electronic signature information read by the reading unit, and when the authentication is successful, reads the target program from the storage unit and launches the target program according to the setting information.

Furthermore, according to another aspect of the present invention, there is provided an image processing method including reading setting information on a target program to be launched, storage-medium identification information for uniquely identifying the storage medium, and electronic signature information generated from the setting information and the storage-medium identification information from a storage medium that is inserted in a storage-medium drive unit in a removable manner; and launching including performing an authentication of the setting information using the storage-medium identification information and the electronic signature information read at the reading, and when the authentication is successful, reading the target program from a storage unit, and launching the target program according to the setting information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram of an example of a master setting file according to the present embodiment;

FIG. 6 is a schematic diagram of an example of a setting file "printer.cnf" according to the present embodiment;

FIG. 7 is a schematic diagram of an example of a setting file "scanner.cnf" according to the present embodiment;

FIG. 8 is a schematic diagram of an example of an SD-card file tree according to the present embodiment;

DETAILED DESCRIPTION OF THE PREFERRED EMBODIMENTS

Exemplary embodiments of the present invention are explained in detail below with reference to the accompanying drawings.

Figure 1:
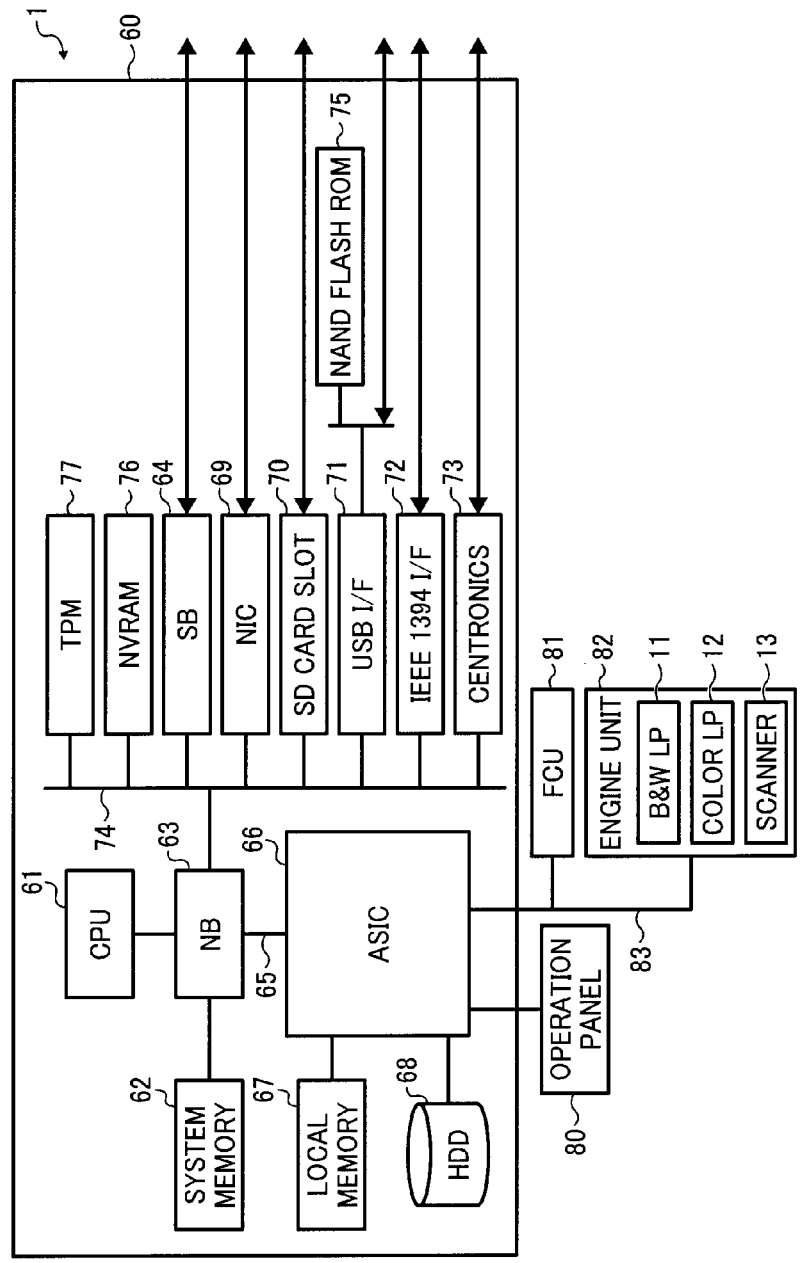
FIG. 1 is a block diagram of an example of a hardware configuration of a MFP according to a present embodiment of the present invention.

FIG. 1 is a block diagram of an example of a hardware configuration of a multifunction product (MFP) 1 according to an embodiment. The MFP 1 includes a controller 60, an operation panel 80, a facsimile control unit (FCU) 81, and an engine unit 82. The controller 60 includes a central processing unit (CPU) 61, a system memory 62, a northbridge (NB) 63, a southbridge (SB) 64, an application-specific integrated circuit (ASIC) 66, a local memory 67, a hard disk drive (HDD) 68, a network interface card (NIC) 69, a secure digital (SD) card slot 70, a universal serial bus interface (USB I/F) 71, a NAND flash read-only memory (NAND flash ROM) 75, an IEEE 1394 interface (IEEE 1394 I/F) 72, a centronics 73, a nonvolatile random-access memory (NVRAM) 76, and a trusted platform module (TPM) 77.

The operation panel 80 is connected to the ASIC 66 of the controller 60. Also, the FCU 81 and the engine unit 82 are connected to the ASIC 66 of the controller 60 via a peripheral component interconnect (PCI) bus 74.

In the controller 60, the local memory 67 and the HDD 68, for example, are connected to the ASIC 66, and the CPU 61 and the ASIC 66 are connected to each other via the NB 63 of a CPU chip set. With the CPU 61 and the ASIC 66 being connected together via the NB 63, the controller 60 supports the case where the interface of the CPU 61 is not disclosed. The ASIC 66 and the NB 63 are connected to each other via an accelerated graphics port (AGP) bus 65. In this manner, with the ASIC 66 and the NB 63 connected to each other via the AGP bus 65 instead of a low-speed PCI bus, a decrease in performance is prevented.

The NB 63 is a bridge for connecting the CPU 61, the system memory 62, the SB 64, the ASIC 66, the NIC 69, the SD card slot 70, the USB I/F 71, the IEEE 1394 I/F 72, and the centronics 73.

The SB 64, the NIC 69, the SD card slot 70, the USB I/F 71, the IEEE 1394 I/F 72, and the centronics 73 are connected to the NB 63 via a PCI bus 74. The SB 64 is a bridge for connecting the PCI bus 74 to the ROM, peripheral devices, and others.

The CPU 61 reads and launches various types of software stored in the ROM, the HDD 68, and the NAND flash ROM 75 connected via the SB 64, thereby controlling the entire MFP 1 and achieving various functions.

The system memory 62 is a memory for use as a rendering memory of the MFP 1. The local memory 67 is a memory for use as a copy image buffer or a coding buffer.

The ASIC 66 is an integrated circuit (IC) for image processing including hardware for image processing. The HDD 68 is an auxiliary storage device that stores image data, document data, various types of software, font data forms, and others.

The NIC 69 is an interface device that connects the MFP 1 to a network. The SD card slot 70 is a portion in which an SD card can be inserted in a removable manner, and interrupts to an SD card-access driver to be explained below according to the insertion or removal of the SD card. The USB I/F 71, the IEEE 1394 I/F 72, and the centronics 73 are interfaces complying with respective specifications. The USB I/F 71 has the NAND flash ROM 75 connected thereto. In the NAND flash ROM 75, various types of software are stored, which include essential software that is essential for the MFP 1 and optional software incorporated in the MFP 1 as an option. The NVRAM 76 has stored therein various types of data and software for the CPU 61 to execute the software. The TPM 77 has stored therein an encryption key for decrypting an electronic signature file, which will be explained further below.

The operation panel 80 receives an input operation from an operator, and presents a display for the operator. The engine unit 82 includes, as an image processing unit that processes images, a black-and-white laser printer (B&W LP) 11, a color laser printer (color LP) 12, and a scanner 13. The FCU 81 is a unit that controls facsimile communications, and has a memory not shown. This memory is used, for example, for temporarily storing facsimile data received when power of the MFP 1 is turned OFF.

Figure 2:
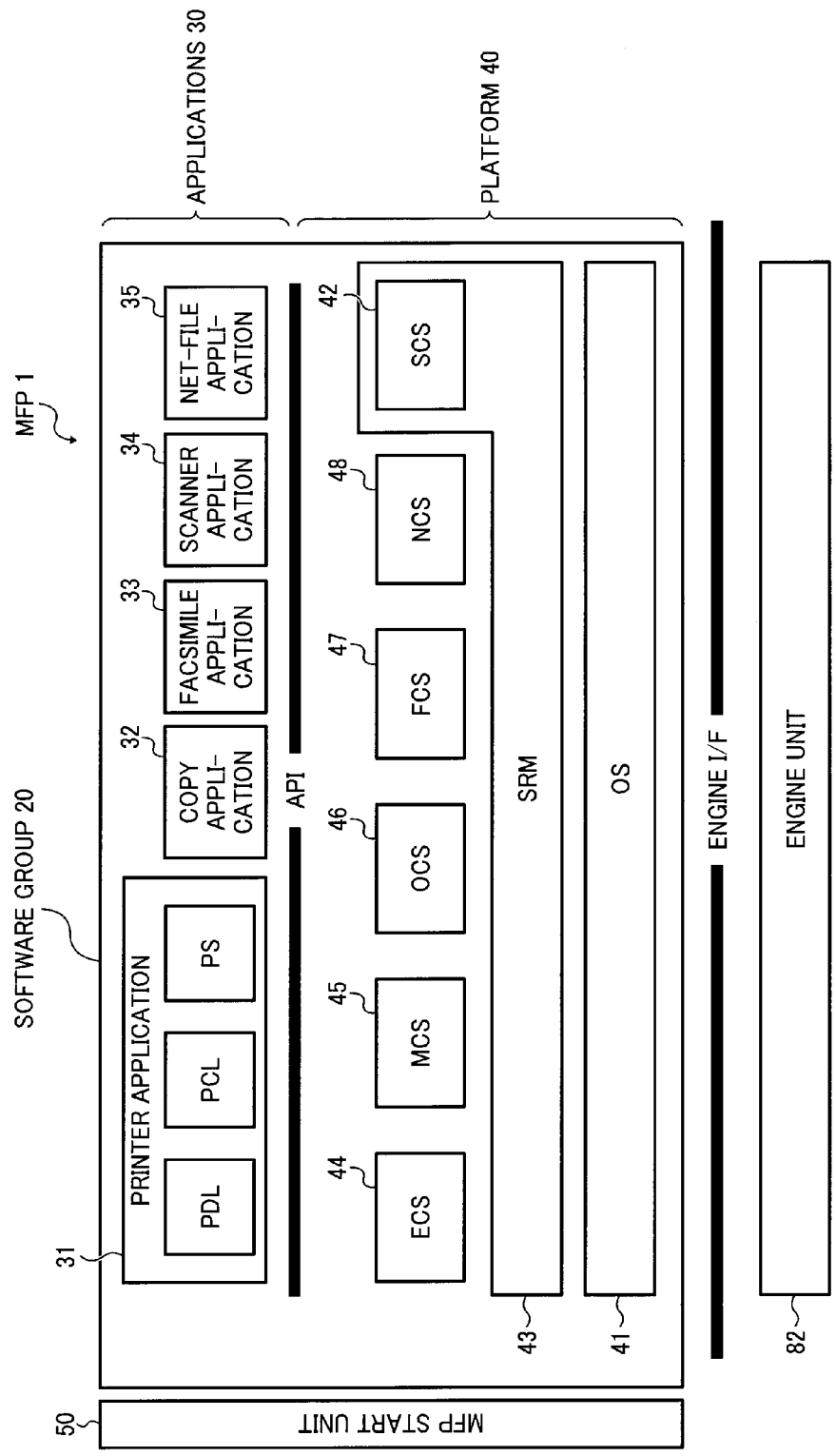
FIG. 2 is a block diagram of an example of a software configuration of the MFP according to the present embodiment.

FIG. 2 is a block diagram of an example of a software configuration of the MFP 1. The MFP 1 includes a software group 20 and a MFP start unit 50. The software group 20 has applications 30 and a platform 40. In substance, these are the software stored in the ROM, the HDD 68, or the NAND flash ROM 75. The CPU 61 reads and executes the software, whereby various functions explained below are achieved.

The MFP start unit 50 is initially operated upon power-up of the MFP 1, launching the platform 40 and the applications 30. The applications 30 are each for performing a process unique to a user service associated with an image forming process, such as a printer, copier, facsimile, or scanner.

The applications 30 includes a printer application 31, which is a software program for printer with a page description language (PDL) or a page control language (PCL), and postscript (PS), a copy application 32, which is a software program for copy; a facsimile application 33, which is a software program for facsimile, a scanner application 34, which is a software program for scanner, and a net-file application 35, which is a software program for network files.

Also, the platform 40 is configured to include control services interpreting a process request from the applications 30 and generating a request for obtaining a hardware resource, a system resource manager (SRM) 43 that manages one or more of the B&W LP 11, the color LP 12, and the scanner 13 and arbitrates an obtainment request from the control services, and an operating system (OS) 41.

The control services are configured to include one or more modules, such as a system control service (SCS) 42, an engine control service (ECS) 44, a memory control service (MCS) 45, an operation panel control service (OCS) 46, a facsimile control service (FCS) 47, and a network control service (NCS) 48.

The platform 40 is configured to include an application program interface (API) that allows reception of a process request from the applications 30 based on a function defined in advance. The OS 41 is UNIX (registered trademark), for example, concurrently executing each software program of the platform 40 and the applications 30 as a process.

The process of the SRM 43 is to control the system and manage the hardware resources together with the SCS 42. For example, in the process of the SRM 43, arbitration is performed according to a request from an upper layer using a hardware resource, such as an engine, memory, HDD file, or host Input/Output (I/O) (such as Centro I/F, network I/F, IEEE 1394 I/F, or RS232C I/F) execution is controlled.

Specifically, the SRM 43 determines whether the requested hardware resource is available (whether it is not being used based on another request) and, when it is available, notifies the upper layer that the request hardware resource is available. Also, the SRM 43 performs scheduling for using the hardware resource upon request from the upper layer, and directly performs the requested action (for example, conveying paper by the printer engine and forming an image, allocating the memory, or generating a file).

The process of the SCS 42 is to manage software, control the operation panel 80 and cause a screen display, cause a light-emitting diode (LED) display, manage the hardware resources, control interrupt software, and others. The process of the ECS 44 is to control the engines of the B&W LP 11, the color LP 12, the scanner 13, and others.

The process of the MCS 45 is to control memory, such as allocating and deallocating image memory, using the HDD 68, and compressing and extracting image data. The process of the OCS 46 is to control the operation panel 80.

The process of the FCS 47 is to provide an API for facsimile transmission and reception from each software layer of a system controller by using a public switched telephone network (PSTN) or an integrated services digital network (ISDN), registration and citation of various types of facsimile data managed by backup memory, facsimile reading, and facsimile printing.

The process of the NCS 48 is to provide commonly-usable services to software requiring a network I/O, distributing data received via each protocol from the network side to each software program and performing intermediation when transmitting data from each software to the network side.

For example, based on hypertext transfer protocol (HTTP), the NCS 48 uses hypertext transfer protocol daemon (httpd) to control data communications with network devices connected via a network.

The MFP 1 can perform a process commonly required for each process with the platform 40 in a unified manner. The CPU 61 of this MFP 1 executes the SCS 42, the SRM 43, the ECS 44, the MCS 45, the OCS 46, the FCS 47, and the NCS 48 each as a process on the OS 41, and also executes, as appropriate, the printer application 31, the copy application 32, the facsimile application 33, the scanner application 34, and the net-file application 35 that form the applications 30, thereby achieving various functions.

Figure 3:
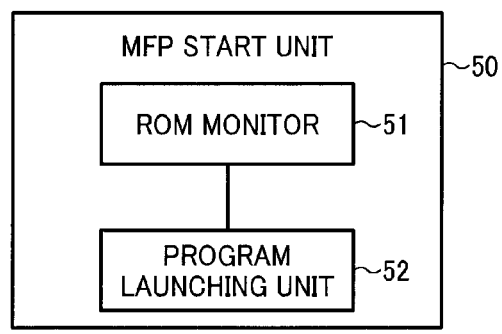
FIG. 3 is a schematic diagram of an example of a configuration of a MFP starting unit of the MFP.

FIG. 3 is a schematic diagram of an example of a configuration of the MFP start unit 50. The MFP start unit 50 includes a ROM monitor 51 and a program launching unit 52. The ROM monitor 51 as a basic input output system (BIOS) and boot loader is operated upon power-up, initializing hardware, diagnosing the controller 60, and initializing software, for example. The ROM monitor 51 loads a kernel and root file system onto the system memory 62 to launch the kernel. Then, the kernel mounts the root file system.

The program launching unit 52 as an application and service launching program is called from the kernel, allocating a memory region on the system memory 62 and the local memory 67. The program launching unit 52 is a process initially launched in the MFP 1, mounting a file system according to a predetermined setting file. The program launching unit 52 reads any of the applications 30 and programs of the platform 40 required for the operation of the MFP 1 from the ROM, the HDD 68, the NAND flash ROM 75, or others according to the predetermined setting file (setting information), and loads each read program onto the memory area allocated on the system memory 62 and the local memory 67 to execute the process of the application 30 and the platform 40.

Figure 4:
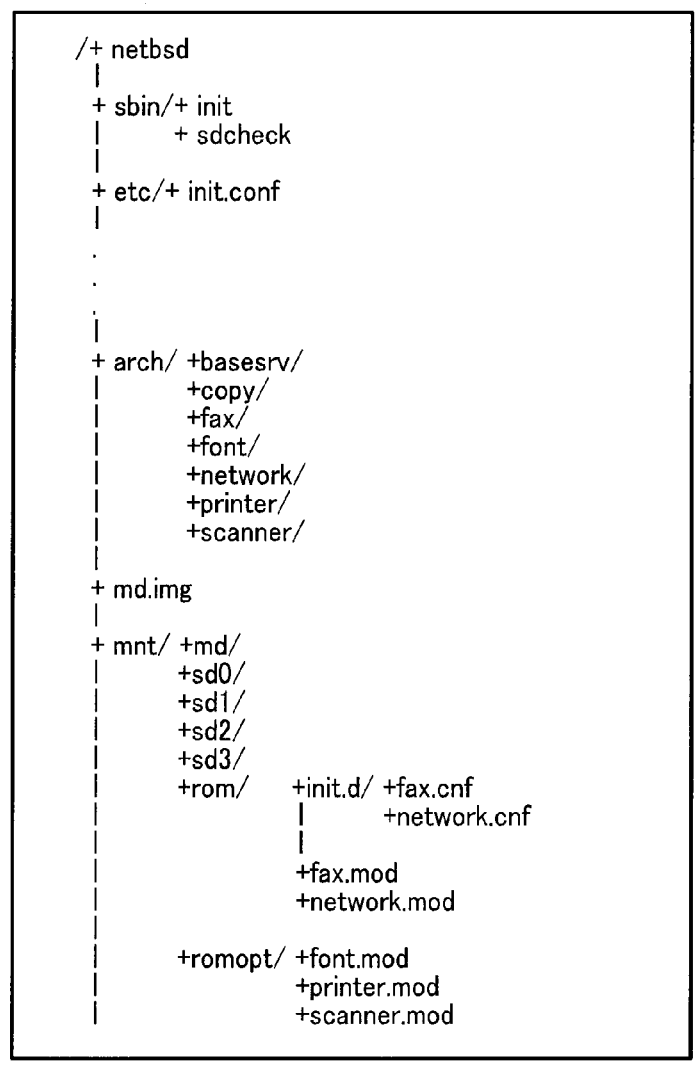
FIG. 4 is a schematic diagram of an example of a file tree according to the present embodiment.

Specifically, the program launching unit 52 reads a predetermined master setting file upon start-up, and mounts a file system and executes a process according to the read master setting file. For example, in the case of a file tree exemplarily depicted in FIG. 4, the program launching unit 52 reads "/etc/+init.conf" as a master setting file at the time of start-up.

When the read master setting file has mount descriptions, the program launching unit 52 performs mounting according to the mount descriptions. For example, in the case of a master setting file exemplarily depicted in FIG. 5, the program launching unit 52 mounts file systems on SD cards 0 to 3 according to the mount descriptions.

Also, when the root of the mounted file system has a predetermined setting file or has a predetermined directory containing a file with a predetermined extension, the program launching unit 52 reads the predetermined setting file or the file with the predetermined extension to mount the file system.

For example, when the root of the mounted SD-card file system has a directory "init.d" exemplarily depicted in FIG. 6 and that directory contains a file with an extension "conf" or "cnf", the program launching unit 52 performs mounting according to mount descriptions in that file.

For example, when the root of the mounted SD-card file system has a setting file "printer.cnf" exemplarily depicted in FIG. 7 or a setting file "scanner.cnf" depicted in FIG. 8, the program launching unit 52 performs mounting according to mount descriptions in that setting file.

Examples of file systems that can be mounted by the program launching unit 52 include "gzromfs" exemplarily depicted in FIG. 5. This file system "gzromfs" loads and mounts a gzip-compressed file in a ROMFS format onto a memory area allocated on the system memory 62, the local memory 67, or the NVRAM 76.

Figure 9:
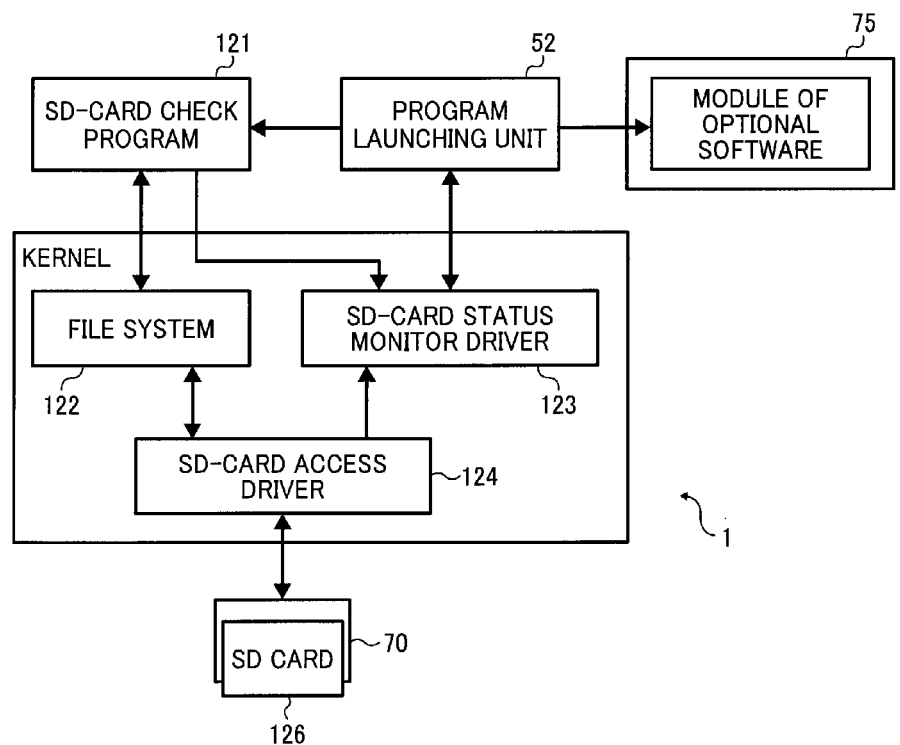
FIG. 9 is a schematic diagram of an example of a configuration of a function of launching optional software upon insertion of an SD card according to the present embodiment.

FIG. 9 is a schematic diagram of an example of a configuration of a function of launching the optional software explained above upon insertion of an SD card in the MFP 1 configured as above. So-called hot swapping of an SD card 126 is allowed with the MFP 1 being power-up. The SD card 126 can be inserted into or removed from the SD card slot 70. The SD card slot 70 interrupts to an SD-card access driver 124 according to insertion or removal of the SD card 126.

The SD-card access driver 124 controls access to the SD card 126. In response to an interruption from the SD card slot 70, the SD-card access driver 124 notifies an SD-card status monitor driver 123 of insertion or removal of the SD card 126.

The SD-card status monitor driver 123 manages status information of the SD card 126, such as insertion, removal, or mount of the SD card 126, notifying the program launching unit 52 of status information of the SD card 126.

The program launching unit 52 launches an SD-card check program 121 according to the status information of the SD card 126 from the SD-card status monitor driver 123. Also, the program launching unit 52 uses a setting file, which will be explained further below, stored in the SD card 126 to read and launch a module of optional software stored in the NAND flash ROM 75.

The SD-card check program 121 is to check the SD card 126 as to whether a partition is correct and whether the state of the file system is correct to make a file system 122 to be usable. For example, the SD-card check program 121 has functions of checking, mounting, and unmounting the SD card 126, and notifying the state of the SD card 126.

The SD-card check program 121, the SD-card status monitor driver 123, and the SD-card access driver 124 are stored in the ROM or the HDD 68, for example.

Figure 10:
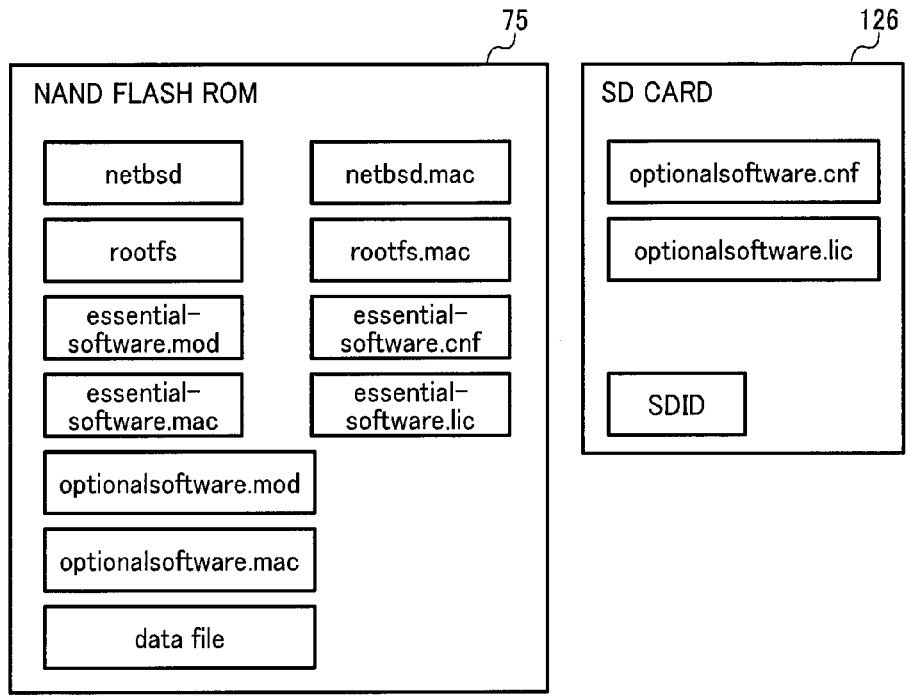
FIG. 10 is a schematic diagram of a file configuration of various types of software stored in a NAND Flash ROM and a file configuration in the SD card according to the present embodiment.

FIG. 10 is a schematic diagram of a file configuration of various types of software stored in the NAND flash ROM 75 and file configuration in the SD card 126. "netbsd" represents the OS 41 for functioning as the MFP 1. "netbsd.mac" represents an electronic signature file for use in authentication check of the OS 41. "rootfs" represents a root file system of the OS 41. "rootfs.mac" represents an electronic signature file for use in authentication check of the root file system of the OS 41.

The file configuration of essential software includes "essential software.mod", "essential software.mac", "essential software.cnf", and "essential software.lic". "essential software.mod" represents a module of the essential software. "essential software.mac" represents an electronic signature file for use in authentication check of the module of the essential software. "essential software.cnf" represents a setting file associated with the essential software. "essential software.lic" represents an electronic signature file for use in authentication of the setting file "essential software.cnf".

The file configuration of optional software includes "optionalsoftware.mod", "optionalsoftware.mac", "optionalsoftware.cnf", and "optionalsoftware.lic". In the present embodiment, "optionalsoftware.mod" and "optionalsoftware.mac" are stored in the NAND flash ROM 75, whilst "optionalsoftware.cnf" and "optionalsoftware.lic" are stored in the SD card 126. Also in the SD card 126, "SD ID" by which the SD card 126 is uniquely identified is provided and stored.

"optionalsoftware.mod" represents a module of the optional software. "optionalsoftware.mac" represents an electronic signature file for use in authentication check of the module of the optional software. "optionalsoftware.cnf" represents a setting file associated with the optional software. "optionalsoftware.lic" represents an electronic signature file for use in authentication check of the setting file "optionalsoftware.cnf", the electronic signature file (electronic signature information) being generated from the setting file and a message digest (MD) of the SD ID of the SD card.

Among a plurality of essential softwares and optional softwares, one for each will be explained for the purpose of simplification. Also, examples of the essential software include the SCS 42, the SRM 43, the MCS 45, the OCS 46, and the copy application 32. The optional software is at least any one of the printer application 31, the facsimile application 33, the scanner application 34, and the net-file application 35, for example.

Figure 11:
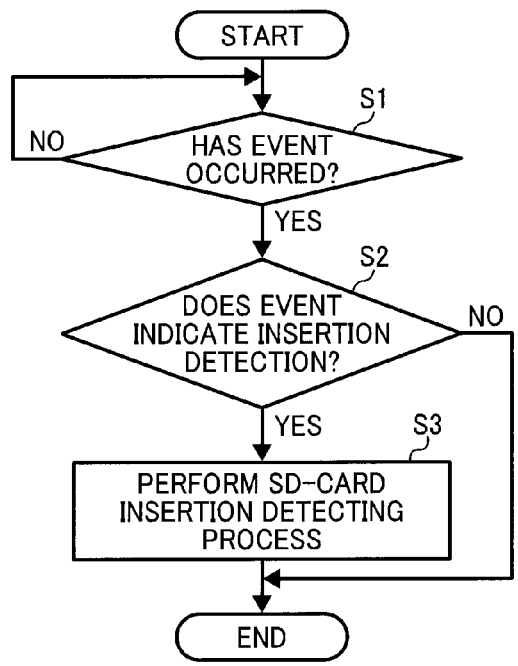
FIG. 11 is a flowchart of a procedure of an event waiting process according to the present embodiment.

Next, the procedure of launching the optional software by the MFP 1 according to the present embodiment is explained. The program launching unit 52 of the MFP 1 becomes in an event wait state after launching a process of the applications 30 and the platform 40 of the MFP 1. FIG. 11 is a flowchart of a procedure of an event waiting process. At Step S1, the program launching unit 52 determines whether an event has occurred. When determining that no event has occurred ("NO" at Step S1), the program launching unit 52 repeats the process of step S1. When determining that an event has occurred ("YES" at Step S1), the system control proceeds to step S2.

For example, when the SD card 126 is inserted in the SD card slot 70, the SD-card access driver 124 notifies the SD-card status monitor driver 123 of the insertion of the SD card 126 according to an interruption from the SD card slot 70. Then, the SD-card status monitor driver 123 notifies the program launching unit 52 of the insertion of the SD card 126. When notified by the SD-card status monitor driver 123 of the insertion of the SD card 126, the program launching unit 52 determines that an event has occurred.

Also, when the SD card 126 is removed from the SD card slot 70, the SD-card access driver 124 notifies the SD-card status monitor driver 123 of the removal of the SD card 126 according to an interruption from the SD card slot 70. Then, the SD-card status monitor driver 123 notifies the program launching unit 52 of the removal of the SD card 126. When notified by the SD-card status monitor driver 123 of the removal of the SD card 126, the program launching unit 52 determines that an event has occurred.

Figure 12:
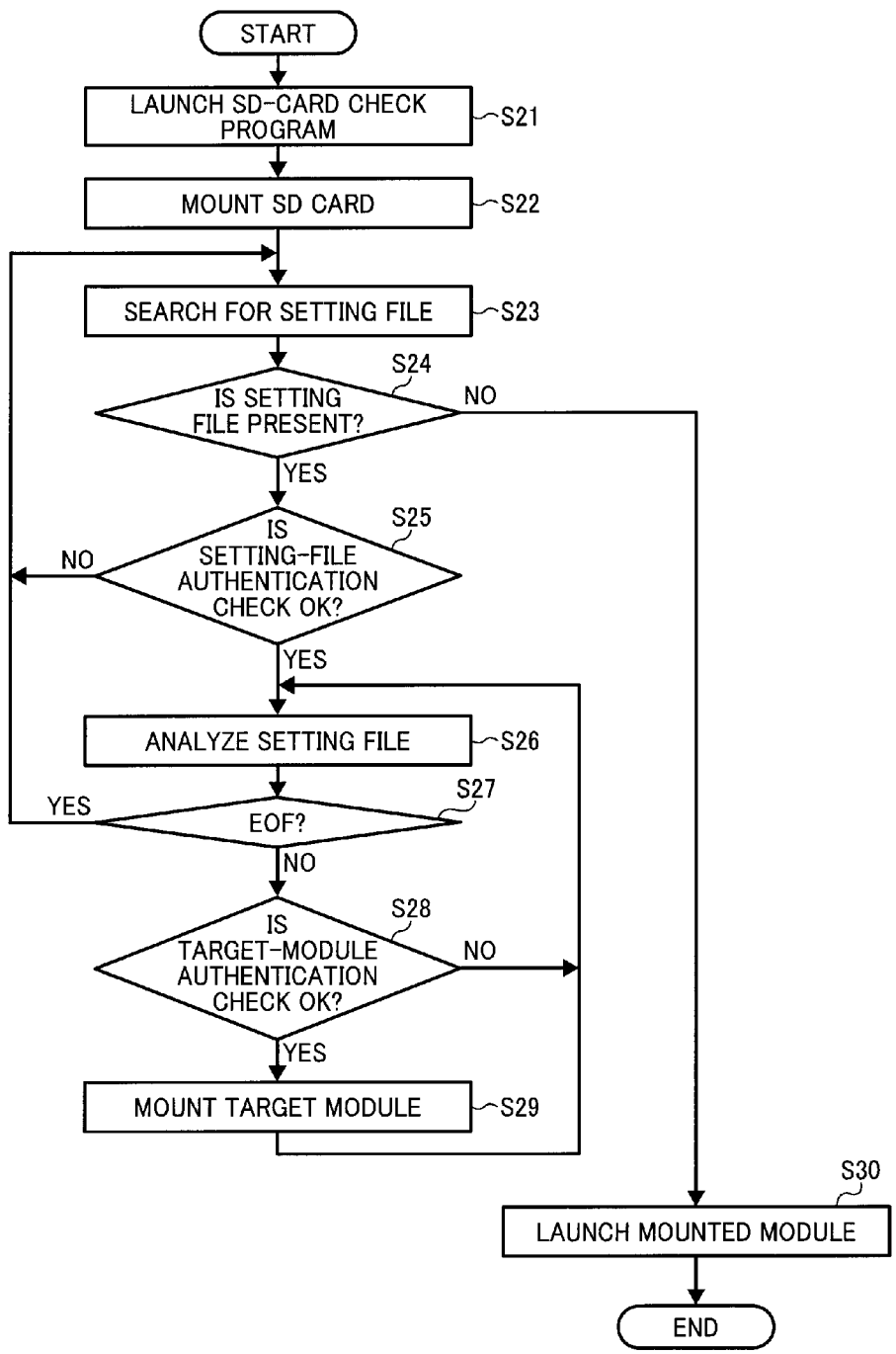
FIG. 12 is a flowchart of a procedure of an SD-card insertion detecting process according to the present embodiment.

At Step S2, the program launching unit 52 determines what the event indicates. When the event indicates detection of insertion of the SD card 126, the system control proceeds to step S3, where the program launching unit 52 performs an SD-card insertion detecting process. FIG. 12 is a flowchart of a procedure of an SD-card insertion detecting process. At Step S21, the program launching unit 52 launches the SD-card check program 121. Following Step S21, the system control proceeds to Step S22, where the SD-card check program 121 causes the SD card 126 to be mounted, notifies the SD-card status monitor driver 123 of the mount of the SD card 126, and stops the process. At this time, the SD ID of the SD card 126 is also mounted.

Figure 13:
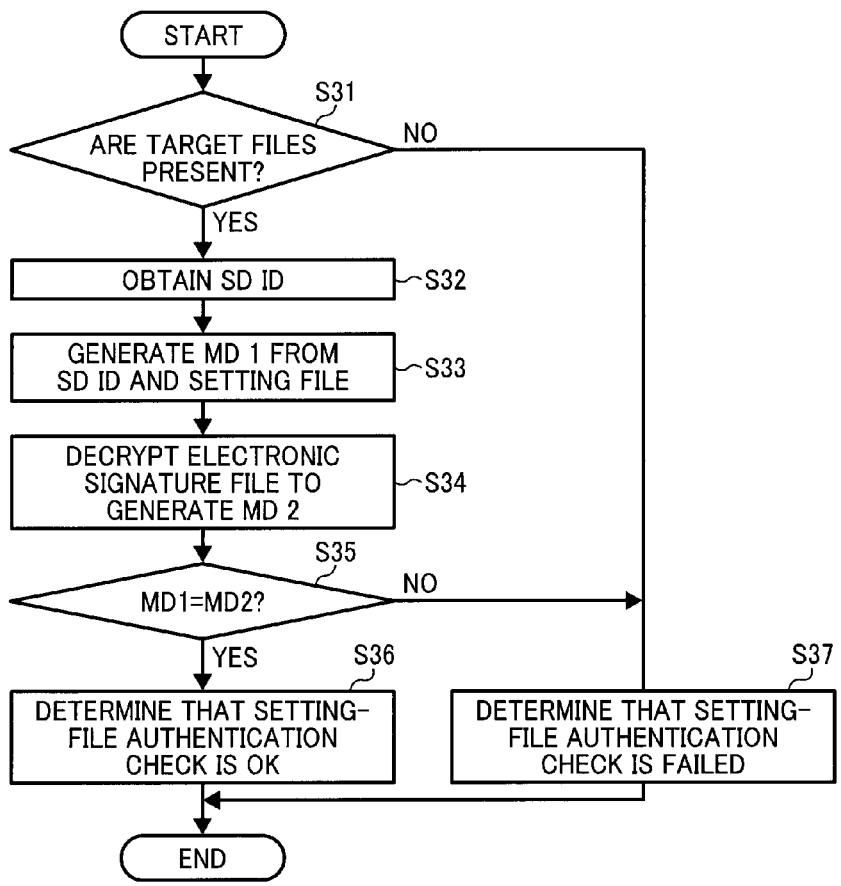
FIG. 13 is a flowchart of a procedure of a setting-file authentication check according to the present embodiment.

Next, at Step S23, the program launching unit 52 searches the mounted SD card 126 for a setting file. When the mounted SD card 126 has a setting file ("YES" at Step S24), the system control proceeds to Step S25. If the mounted SD card 126 does not have a setting file ("NO" at Step S24), the system control proceeds to Step S30. At Step S25, the program launching unit 52 performs an authentication check on the setting file by using a library for electronic authentication check. FIG. 13 is a flowchart of a procedure of a setting-file authentication check.

At Step S31, the program launching unit 52 determines whether the SD card 126 has target files for use in setting-file authentication check. The target files for use in setting-file authentication check include the setting file and the electronic signature file generated from the setting file and the MD of the SD ID of the SD card 126.

Figure 14:
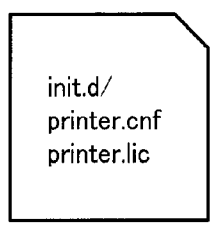
FIG. 14 is a schematic diagram of an example of target files stored in the SD card according to the present embodiment.

FIG. 14 is a schematic diagram of an example of the target files stored in the SD card 126. As the optional software, target files associated with the printer application 31 are exemplarily depicted. In FIG. 14, "printer.cnf" represents the setting file of the printer application 31, whilst "printer.lic" represents the electronic signature file for use in authentication check of "printer.cnf".

When determining that target files for use in setting-file authentication check are present ("YES" at Step S31), the program launching unit 52 obtains the setting file and the electronic signature file for use in the setting-file authentication check from the SD card 126, and then proceeds to Step S32.

At Step S32, the program launching unit 52 obtains the SD ID of the SD card 126 from the SD card 126. The system control proceeds to Step S33, where the program launching unit 52 generate an MD 1 from the setting file obtained at Step S31 and the SD ID of the SD card 126 obtained at Step S32. Following Step S33, the system control proceeds to Step S34, where the program launching unit 52 reads an encryption key stored in the TPM 77, and decrypts the electronic signature file obtained at Step S31 by using this encryption key to generate an MD 2.

The system control proceeds to Step S35, where the program launching unit 52 determines whether the MD 1 generated at Step S33 and the MD 2 generated at Step S34 are identical to each other. When determining that the MD 1 and the MD 2 are identical to each other ("YES" at Step S35), the system control proceeds to Step S36, where the program launching unit 52 determines that the setting-file authentication check is OK.

On the other hand, when determining that the MD 1 and the MD 2 are not identical to each other ("NO" at Step S35), the system control proceeds to Step S37, where the program launching unit 52 determines that the setting-file authentication check is failed. This is because when the MD 1 and the MD 2 are not identical to each other, there is a high possibility that the files stored in the SD card 126 are illegally copied.

When determining that no target files for use in setting-file authentication check are present ("NO" at Step S31), the system control proceeds to Step S37, where the program launching unit 52 determines that the setting-file authentication check is failed.

Figures 15, 16:
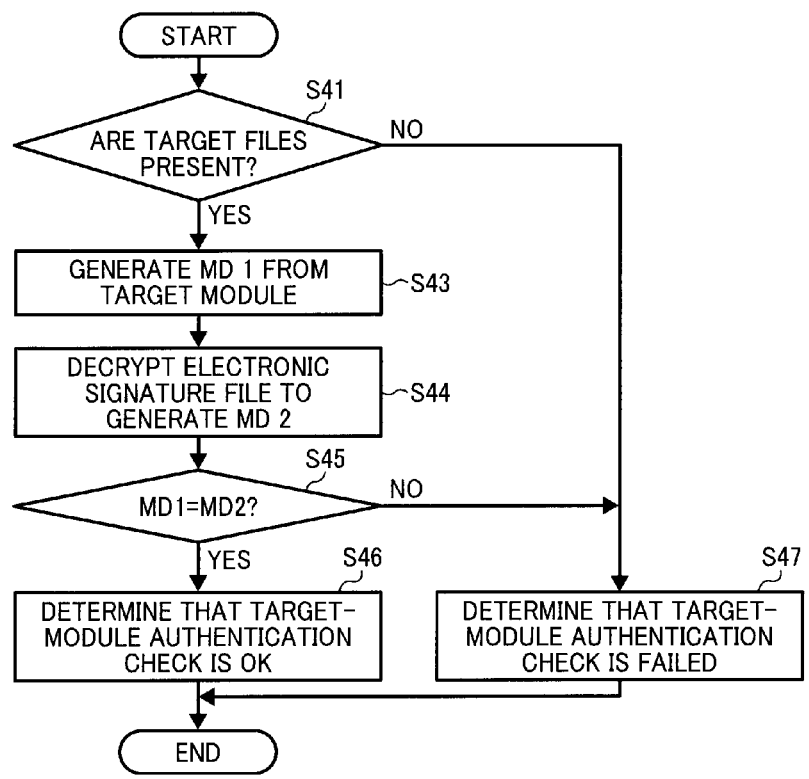
FIG. 15 is a schematic diagram of an example of a setting file according to the present embodiment.
FIG. 16 is a flowchart of a procedure of a target-module authentication check according to the present embodiment.

Referring back to FIG. 12, when the setting-file authentication check is OK ("YES" at Step S25), the system control proceeds to Step S26, where the setting file is analyzed as exemplified in FIG. 15. When the setting-file authentication check is failed ("NO" at Step S25), the system control proceeds to Step S23.

FIG. 15 is a schematic diagram of an example of the setting file. The setting file represents a read instruction for reading the target module and a launch instruction for launching the target module. In FIG. 15, data in the first line represents a mount instruction, indicating that "romopt/printer.mod", which is a gzip-compressed file in a ROMFS format and is stored in the NAND flash ROM 75, is to be mounted onto a mount point "/arch/printer". "printer.mod" represents a module for launching the printer application 31. In FIG. 15, data in the second line represents a launch instruction, indicating that the module mounted according to the mount instruction is to be launched.

Following Step S26, the system control proceeds to Step S27, where it is determined whether end of file (EOF) has been searched for. When it is determined that EOF has been searched for ("YES" at Step S27), the system control returns to Step S23. On the other hand, when it is determined that EOF has not been searched for ("NO" at Step S27), the system control proceeds to Step S28.

At Step S28, when the setting file includes a mount description, the program launching unit 52 performs a target-module authentication check for the target module to be mounted by using the library for electronic authentication check. FIG. 16 is a flowchart of a procedure of a target-module authentication check.

At Step S41, the program launching unit 52 determines whether the NAND flash ROM 75 has target files for use in target-module authentication check. The target files for use in target-module authentication check include a target module and an electronic signature file generated from the MD of that module.

When it is determined that target files for use in target-module authentication check are present ("YES" at Step S41), the program launching unit 52 obtains the target module and the electronic signature file for use in the target-module authentication check from the NAND flash ROM 75, and the system control then proceeds to Step S43.

At Step S43, the program launching unit 52 generates an MD 1 of the module obtained at Step S41. The system control proceeds to Step S44, where the program launching unit 52 decrypts the electronic signature file obtained at Step S41 with an encryption key to generate an MD 2.

The system control proceeds to Step S45, where the program launching unit 52 determines whether the MD 1 generated at Step S43 and the MD 2 generated at Step S44 are identical to each other. When determining that the MD 1 and the MD 2 are identical to each other ("YES" at Step S45), the system control proceeds to Step S46, where the program launching unit 52 determines that the target-module authentication check is OK.

On the other hand, when determining that MD 1 and the MD 2 are not identical to each other ("NO" at Step S45), the system control proceeds to Step S47, where the program launching unit 52 determines that the target-module authentication check is failed. This is because when the MD 1 and the MD 2 are not identical to each other, there is a high possibility that the files stored in the NAND flash ROM 75 have been illegally copied or tampered.

When determining that no target files for use in target-module authentication check are present ("NO" at Step S41), the system control proceeds to Step S47, where the program launching unit 52 determines that the target-module authentication check is failed.

Referring back to FIG. 12, when determining that the target-module authentication check is OK ("YES" at Step S28), the system control proceeds to Step S29, where the target module is mounted, and then returns to Step S26. The program launching unit 52 repeats the processes at Steps S23 to S29 until all setting files stored in the SD card 126 are subjected to authentication check.

After all setting files stored in the SD card 126 are subjected to authentication check, the program launching unit 52 determines that the mounted SD card 126 does not have any more setting file ("NO" at Step S24), and then the system control proceeds to Step S30. At Step S30, the program launching unit 52 launches the module mounted at Step S29. The module for which the target-module authentication check is failed is not mounted at Step S29, and therefore is not launched at Step S30.

Therefore, according to the configuration explained above, upon insertion of the SD card 126, the optional software stored in the NAND flash ROM 75 can be launched safely. Thus, it is possible to prevent coping and unauthorized use of the optional software. Also, because the optional software is read and launched from the NAND flash ROM 75 incorporated in the MFP 1, the optional software can be launched at a higher speed compared with the case where the optional software is read and launched from the SD card, thereby increasing user's usability. Furthermore, because various types of optional software can be stored in the NAND flash ROM 75, it is also possible to reduce the risk of erroneous mounting of a controller board at the time of production of the MFP 1 with a different type of executable optional software.

Note that the present invention is not limited to the present embodiment, but can be embodied at a practical stage by modifying the components within a range of not deviating from the gist of the present invention. Also, by combining a plurality of components disclosed in the embodiment as appropriate, various embodiments can be configured. For example, several components can be deleted from all components disclosed in the embodiment. Furthermore, components over different embodiments can be combined as appropriate. Still furthermore, various modifications as exemplified below are possible.

In the present embodiment, as the optional software, the printer application 31 depicted in FIG. 2 is explained. The optional software is not limited to this, however, and can be the copy application 32, the facsimile application 33, the scanner application 34, or the net-file application 35, for example.

Moreover, in the present embodiment explained above, as the image processing apparatus, the MFP having a plurality of image processing units that process images are explained. Alternatively, for example, the image processing apparatus can be a copy apparatus, a scanner apparatus, or a facsimile apparatus having at least one image processing unit that process images.

Furthermore, in the present embodiment explained above, the NAND flash ROM 75 can be configured to be connected not to the USB I/F 71 but directly to the PCI bus 74.

Moreover, in the present embodiment explained above, the encryption key is stored in the TPM 77. Alternatively, the MFP 1 can not have the TPM 77, and the encryption key can be stored in the NVRAM 76, the HDD 68, or the NAND flash ROM 75.

In FIG. 14 of the present embodiment explained above, the example is explained in which the setting file and the electronic signature file associated with one optional software are stored in the SD card 126. Alternatively, setting files and electronic signature files associated with a plurality of different optional softwares can be stored in the SD card 126. In such a configuration, storage media functioning as a license key of the optional software can be combined into one storage medium. Therefore, the number of extension slots in which a storage medium can be inserted in a removable manner can be reduced to a minimum-required number, thereby also reducing cost.

Figure 17:
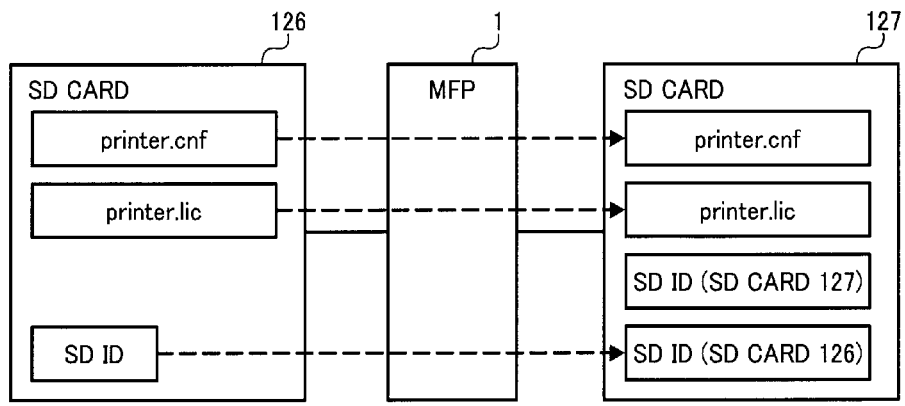
FIG. 17 is a schematic diagram of a case according to one modification example of the present embodiment where a setting file and an electronic signature file are moved to another SD card.

A modified example of the present embodiment is explained. In the modified example, the setting file and the electronic signature file stored in the SD card 126 in the present embodiment explained above can be moved to another SD card. In this case, the MFP 1 includes two or more SD card slots, for example. This configuration for moving the setting file and the electronic signature file stored in the SD card 126 inserted in one SD card slot to another SD card inserted in another SD card slot is disclosed in, for example, Japanese Patent Application Laid-Open No. 2005-174199 and Japanese Patent Application Laid-Open No. 2005-174200, and therefore are not explained in detail herein. It is assumed in the present example that "printer.mod" exemplified as the program data and "printer.mac" exemplified as module electronic authentication are stored in advance in the NAND flash ROM 75, while the setting file "printer.cnf" as license data and an electronic signature file "printer.lic" as a license electronic signature are stored in the SD card 126. Also, for example, the SCS 42 of the MFP 1 with the SD card 126 and an SD card 127 exemplified in FIG. 17 obtains the setting file "printer.cnf", the electronic signature file "printer.lic", and the SD ID of the SD card 126 stored in the SD card 126, and then causes them to be stored in the SD card 127. Also, for example, the SCS 42 deletes the electronic signature file "printer.lic" stored in the SD card 126 or adds an invalidation flag to the setting file "printer.cnf" stored in the SD card 126 to cause the setting file "printer.cnf" stored in the SD card 126 to be invalid.

Figure 18:
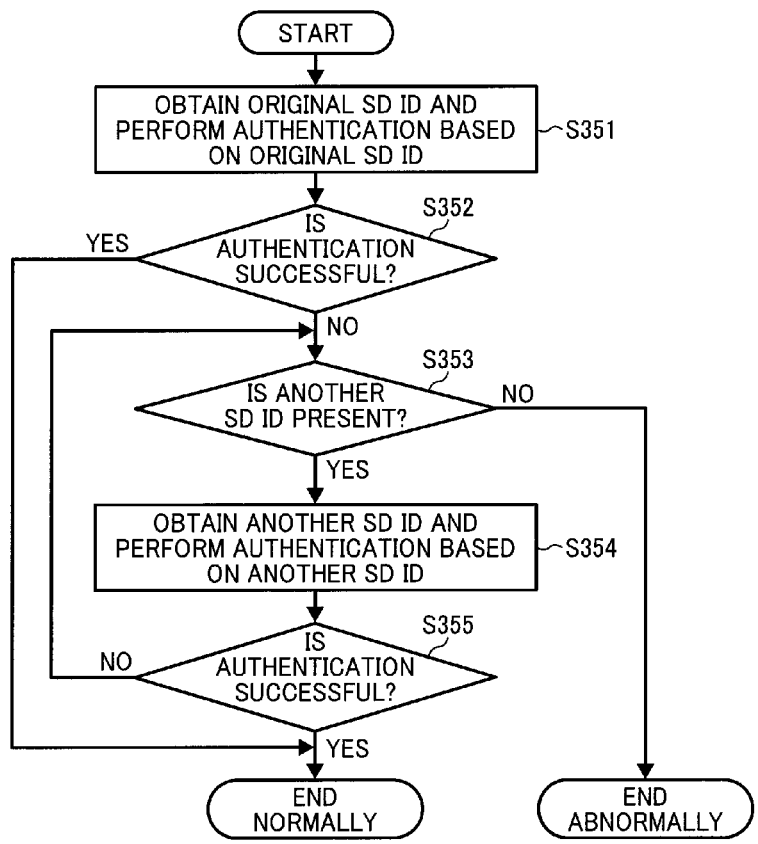
FIG. 18 is a flowchart of a procedure of a setting-file authenticating process according to the modification example.

Then, when launching "printer.mod" stored in the NAND flash ROM 75, at Step S25 in FIG. 12, the MFP 1 follows the procedure exemplified in the flowchart of FIG. 18 when performing a setting-file authentication check of the setting file stored in the SD card 127. It is assumed that this authentication check is performed by the program launching unit 52, although it can be performed by the SCS 42.

First, for the setting file "printer.cnf" stored in the SD card 127, the program launching unit 52 performs a setting-file electronic authentication of the setting file by using the SD ID by which the SD card 127 can be uniquely identified (the SD ID is hereinafter referred to as an original SD ID) (Step S351). That is, the original SD ID and the setting file "printer.cnf" are converted into numbers with a message digest, for example, and these numerical values and the value of the electronic signature file "printer.lic" are compared with each other.

Following Step S351, the system control proceeds to Step S352, where the program launching unit 52 determines whether the authentication is successful (the compared values are matched). When determining that the authentication is successful, the program launching unit 52 ends the setting-file authentication process normally. This applies to the case, for example where the setting file to be authenticated is not moved from an SD card other than the SD card 127.

On the other hand, when it is determined at Step S352 that authentication fails, the system control proceeds to Step S353, where the program launching unit 52 checks whether an SD ID of any SD card other than the original SD ID (hereinafter referred to as another SD ID) is written in the SD card 127. When another SD ID is not written, the program launching unit 52 ends the authentication process abnormally with the setting file being taken as an unauthorized file. This applies the case, for example where the setting file to be authenticated is not a moved one but a tampered one.

When another SD ID is written in the SD card 127, the system control proceeds to Step S354, where the program launching unit 52 authenticates the setting file based on this another SD ID. Then, when it is determined at Step S355 that the authentication is successful, the program launching unit 52 ends the setting-file authentication process normally. This applies to the case, for example, where the setting file to be authenticated is the one moved from another SD card. In the example explained above, the setting file is moved from the SD card 126 to the SD card 127, which applies to the case explained above.

When it is determined at Step S355 that the authentication fails and when still "another SD ID" is present, the program launching unit 52 repeats the authentication process based on the still another SD ID. When the authentication is successful, the program launching unit 52 ends the authentication process normally. When authentication fails with any of "another SD ID", the program launching unit 52 ends the authentication process abnormally.

Thereafter, the program launching unit 52 performs processing by following the procedure depicted in FIG. 12. According to this configuration, even when the setting file and the electronic signature file stored in the SD card 126 are moved to another SD card 127, the optional software stored in the NAND flash ROM 75 can be mounted and executed safely.

The SD ID of the original SD card (SD card 126) is not necessarily stored in the destination SD card 127, and can be stored in a storage area that the MFP 1 can refer to, such as the HDD 68 or the NAND flash ROM 75.

Also, in the MFP 1, the SD ID of the original SD card 126 may not be used for authentication of the setting information. For example, by using the SD ID of the destination SD card 127, the electronic signature file for the setting file can be newly generated. For example, after the SCS 42 of the MFP 1 having inserted therein the SD card 126 and the SD card 127 obtains the setting file "printer.cnf", the electronic signature file "printer.lic", and the SD ID of the SD card 126 stored in the SD card 126, the SCS 42 deletes the electronic signature file "printer.lic" from the SD card 126. Next, the SCS 42 causes the setting file "printer.cnf" to be stored in the SD card 127, and also causes the electronic signature file "printer.lic" generated by using the setting file and the SD ID of the SD card 127 and encrypted by using an encryption key to be stored in the SD card 127. According to such a configuration, the MFP 1 can perform the process at Step S25 depicted in FIG. 12 in a manner similar to that in the above embodiment. As a result, even when the setting file stored in the SD card 126 is moved to another SD card 127, the optional software stored in the NAND flash ROM 75 can be mounted safely and executed.

According to an aspect of the present invention, it is possible to reduce errors in mounting a controller board at the time of manufacturing, and also preventing unauthorized use of optional software stored in a NAND flash memory on the controller board.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image processing unit, implemented by at least one processor, that processes an image;
a storage unit that stores therein a program for the image processing unit to process the image;
a storage-medium drive unit in which a storage medium is inserted in a removable manner, the storage medium storing therein setting information on a target program in the storage unit to be launched, storage-medium identification information for uniquely identifying the storage medium, and electronic signature information generated from the setting information and the storage-medium identification information and encrypted;
a key storage unit that stores an encryption key in the image processing apparatus;
a reading unit, implemented by at least one processor, that reads the setting information, the storage-medium identification information, and the electronic signature information from the storage medium; and
a launching unit, implemented by at least one processor, that reads the encryption key from the key storage unit, performs decryption of the electronic signature information using the encryption key, performs an authentication of the setting information using the storage-medium identification information and the decrypted electronic signature information read by the reading unit, and when the authentication is successful, reads the target program from the storage unit, and launches the target program according to the setting information,
wherein
the storage medium and the storage unit are distinct memories,
the storage medium includes a first storage medium and a second storage medium,
the first storage medium stores therein the setting information, the electronic signature information, and first storage-medium identification information for uniquely identifying the first storage medium,
the image processing apparatus further comprises:
a storage control unit, implemented by at least one processor, that copies the setting information, the electronic signature information, and the first storage-medium identification information stored in the first storage medium, to the second storage medium, and
an invalidation unit, implemented by at least one processor, that invalidates the setting information stored in the first storage medium,
the reading unit reads the setting information, the electronic signature information, and a second storage-medium identification information for uniquely identifying the second storage medium from the second storage medium, and
the launching unit performs a first authentication of the setting information using the second storage-medium identification information and the electronic signature information read by the reading unit, and when the first authentication fails, causes the reading unit to read the first storage-medium identification information from the second storage medium, perform a second authentication of the setting information using the first storage-medium identification information and the electronic signature information read by the reading unit, and when the second authentication is successful, read the target program from the storage unit and launches the target program according to the setting information.

2. The image processing apparatus according to claim 1, further comprising a monitoring unit, implemented by at least one processor, that monitors whether the storage medium is inserted in the storage-medium drive unit, wherein
upon being notified by the monitoring unit of an insertion of the storage medium in the storage-medium drive unit, the launching unit causes the reading unit to read the setting information, the storage-medium identification information, and the electronic signature information from the storage medium.

3. The image processing apparatus according to claim 1, wherein the setting information includes a mount instruction for mounting the target program and a launch instruction for launching the target program, and when the authentication is successful, the launching unit mounts the target program according to the mount instruction and launches the target program according to the launch instruction.

4. The image processing apparatus according to claim 3, wherein when the authentication is successful and when mounting the target program according to the mount instruction, the launching unit performs an authentication of the target program, when the authentication of the target program is successful, mounts the target program, and launches the target program according to the launch instruction.

5. The image processing apparatus according to claim 1, wherein
the image processing apparatus further comprises:
a generating unit, implemented by at least one processor, that generates the electronic signature information using the setting information and second storage-medium identification information for uniquely identifying the second storage medium; and
a second storage control unit, implemented by at least one processor, that stores the electronic signature information generated by the generating unit in the second storage medium.

6. The image processing apparatus according to claim 1, wherein the storage unit is a NAND flash read-only memory.

7. The image processing apparatus according to claim 1, wherein the key storage unit, which stores the encryption key in the image processing apparatus, is independent of the storage medium.

8. An image processing method implemented using an image processing apparatus, comprising:

reading setting information on a target program to be launched, storage-medium identification information for uniquely identifying a storage medium, and electronic signature information, generated from the setting information and the storage-medium identification information and encrypted, from the storage medium that is inserted in a storage-medium drive unit of the image processing apparatus in a removable manner;

reading an encryption key from a key storage unit of the image processing apparatus;

performing decryption of the electronic signature information using the encryption key;

performing an authentication of the setting information using the storage-medium identification information and the decrypted electronic signature information, and when the authentication is successful, reading the target program from a storage unit, and launching the target program according to the setting information, the storage medium and the storage unit being distinct memories, the storage medium including a first storage medium and a second storage medium, the first storage medium storing therein the setting information, the electronic signature information, and first storage-medium identification information for uniquely identifying the first storage medium, wherein the method further comprises:

copying the setting information, the electronic signature information, and the first storage-medium identification information stored in the first storage medium, to the second storage medium, invalidating the setting information stored in the first storage medium, reading the setting information, the electronic signature information, and a second storage-medium identification information for uniquely identifying the second storage medium, from the second storage medium, and performing a first authentication of the setting information using the second storage-medium identification information and the electronic signature information read by the reading, and when the first authentication fails, reading the first storage-medium identification information from the second storage medium, performing a second authentication of the setting information using the first storage-medium identification information and the electronic signature information read by the reading, and when the second authentication is successful, reading the target program from the storage unit and launching the target program according to the setting information.

* * * * *